W. L. IMLAY.
Apparatus for the Manufacture of Hydrogen Gas.
No. 144,543. Patented Nov. 11, 1873.
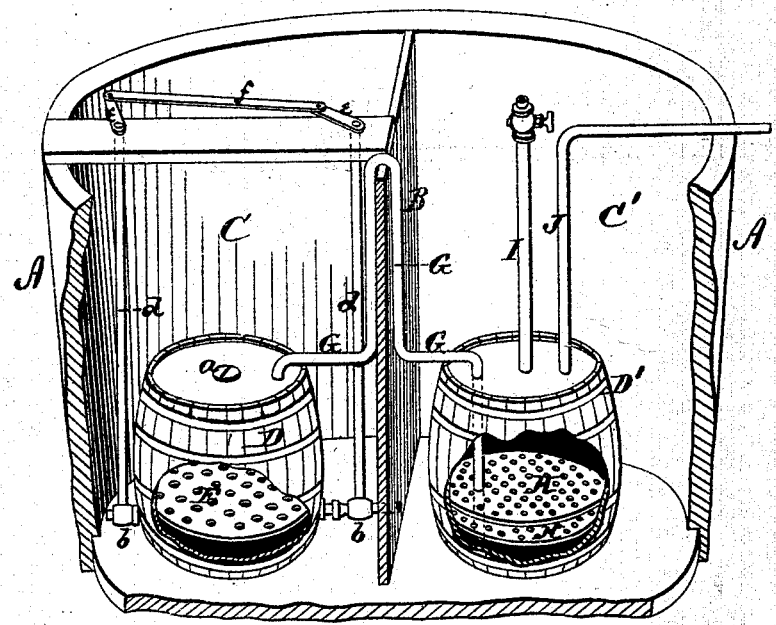
WITNESSES
Henry N. Miller
C. L. Everit
INVENTOR
William L. Imlay
By Alexander & Mason
Attorneys.

UNITED STATES PATENT OFFICE.

WILLIAM L. IMLAY, OF PHILADELPHIA, PENNSYLVANIA.

IMPROVEMENT IN APPARATUS FOR THE MANUFACTURE OF HYDROGEN GAS.

Specification forming part of Letters Patent No. 144,543, dated November 11, 1873; application filed October 9, 1873.

*To all whom it may concern:*

Be it known that I, WILLIAM L. IMLAY, of Philadelphia, in the county of Philadelphia and in the State of Pennsylvania, have invented certain new and useful Improvements in Gas-Machines; and do hereby declare that the following is a full, clear, and exact description thereof, reference being had to the accompanying drawings and to the letters of reference marked thereon making a part of this specification.

The nature of my invention consists in the construction and arrangement of a gas-machine for the manufacture of illuminating hydrogen gas, as will be hereinafter more fully set forth.

In order to enable others skilled in the art to which my invention appertains to make and use the same, I will now proceed to describe its construction and operation, referring to the annexed drawing, which represents a perspective view, partly in section, of my gas-machine.

A represents a tank, of any suitable dimensions and shape, but preferably oval in form, divided by means of a central transverse partition, B, into two equal water-tight compartments, C and C'. In the compartment C is placed the generating-tank D, and in the compartment C' the carbureting-tank D', both of said tanks being in the form of a barrel, and made air and gas tight. The generator D is provided with an opening in its top, which is closed by a screw-plug, $a$. This tank is provided with a false bottom, E, which is perforated, as shown, and intended to support the iron above stop-cocks $b\ b$, one of which passes through the partition B and connects the generator with the other compartment, C', of the tank A. The stop-cocks $b\ b$ are controlled by stems $d\ d$, which rise above the tank A, and have cranks $e\ e$ on their upper ends, these cranks being connected by a bar, $f$, in such a manner that it is impossible to close both of the stop-cocks at the same time; but when one is closed the other must always be open. G is a pipe which starts from the top of the generator D, passes up one side of the partition, over the top, and down the other side thereof, into the carbureter D, to near its bottom. Within the carbureter are a series of perforated disks, H H, which are intended to retard and break up the volume of gas. I is a pipe to conduct the carbureting material into the carbureter D', and J is the outlet-pipe for the carbureted-hydrogen gas generated by this apparatus, said pipe to be connected with the supply-pipes in the house.

The gas in this case is generated from iron, sulphuric acid, and water, and carbureted by means of a hydrocarbon. The iron is placed in the generator D on the perforated false bottom E, and the hydrocarbon in the carbureting-tank D'. Both the compartments C and C' of the main tank A are filled with sulphuric acid and water which enter the tank D through the stop-cocks $b\ b$, and by their action on the iron generate hydrogen-gas, which passes through the pipe G into the tank D', where, passing through the hydrocarbon, it becomes carbureted and formed into a fixed illuminating-gas.

The generator D and carbureter D' being both submerged in the contents of the tank A, perfect security is afforded against the danger of fire, and nearly so against leakage; but if leakage should occur it is instantly detected, which is not generally the case with similar apparatus; besides, an even temperature is obtained and maintained from the same cause, the effect of which is to secure the so much desired uniform flow of gas. The two tanks D D' being of the same size, an equal displacement of the contents of the main tank A must follow, which affords the facility for the acid and water to be transferred from one compartment of the tank to the other by the action of the gas alone. The arrangement of the stop-cocks $b\ b$ on the generator D, by which the two cannot be closed at the same time, prevents the possibility of bursting, which danger other machines are constantly exposed to.

By disconnecting the bar $f$ from the cranks $e\ e$ the acid and water may be driven from the generator, and then, by closing both stop-cocks to the ingress of acid and water, the plug $a$ can be withdrawn to admit fresh supplies of iron.

This machine is simple and cheap in its construction, yet durable and efficient in its operation.

Having thus fully described my invention, what I claim as new, and desire to secure by Letters Patent, is—

The combination of the tank A, having central partition B, the submerged generating-tank D, with plug $a$ and false perforated bottom E, the submerged carbureting-tank D′, with perforated disks H H, the pipes G I J, stop-cocks $b\ b$, and operating-rods $d\ d$, with cranks and connecting-rod, all constructed and arranged substantially as and for the purposes herein set forth.

In testimony that I claim the foregoing I have hereunto set my hand this 8th day of October, 1873.

WILLIAM L. IMLAY.

Witnesses:
 CHAS. G. IMLAY,
 GEO. W. LEHMAN.